US006445283B1

(12) United States Patent
Pang et al.

(10) Patent No.: US 6,445,283 B1

(45) Date of Patent: Sep. 3, 2002

(54) PROCESS AND DEVICE FOR ASSOCIATING A REMOTE CONTROL TO A BASE STATION

(75) Inventors: Peter Pang, Mt. Waverley; Rod Pettit, Wantirna South; Frank Pavatich, Keilor Downs, all of (AU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/331,037

(22) PCT Filed: Nov. 25, 1997

(86) PCT No.: PCT/DE97/02752

§ 371 (c)(1), (2), (4) Date: Sep. 10, 1999

(87) PCT Pub. No.: WO98/27298

PCT Pub. Date: Jun. 25, 1998

(30) Foreign Application Priority Data

Dec. 16, 1996 (DE) ........................................ 196 52 227

(51) Int. Cl.[7] ................................................ H04Q 5/22

(52) U.S. Cl. ................ 340/10.2; 340/10.1; 340/825.69; 340/5.1; 340/10.41; 340/5.61

(58) Field of Search .............................. 340/10.2, 10.1, 340/825.36, 825.49, 825.69, 825.72, 10.32, 10.33, 10.34, 5.1, 5.6, 5.61, 10.41

(56) References Cited

U.S. PATENT DOCUMENTS 4,495,496 A 1/1985 Miller, III .............. 340/825.49
4,763,121 A 8/1988 Tomoda et al. ........ 340/825.69
5,280,267 A 1/1994 Reggiani .................... 340/426

FOREIGN PATENT DOCUMENTS

| | | |
|---|---|---|
| DE | 43 29 697 | 3/1995 |
| EP | 0 285 419 | 10/1988 |
| EP | 0 467 036 | 1/1992 |
| GB | 2 259 227 | 3/1993 |

*Primary Examiner*—Donnie L. Crosland
(74) *Attorney, Agent, or Firm*—Kenyon & Kenyon

(57) ABSTRACT

Method for allocating a remote controller to a base station, having the following steps: emission of a search signal by the base station, reception of the search signal, comparison with a reference signal, and emission of a "present" signal by the actuation element if the search signal matches the reference signal. If no "present" signal arrives in response to a search signal, emission of a search signal by the base station is repeated after a repetition time has elapsed. Execution of the method is accomplished by way of a base station which has means for detecting the time Ts that has elapsed since emission of a search signal, and by way of a remote controller which switches from an idle state into an active state upon arrival of a search signal.

14 Claims, 5 Drawing Sheets

PROCESS AND DEVICE FOR ASSOCIATING A REMOTE CONTROL TO A BASE STATION

BACKGROUND INFORMATION

A conventional method is described in European Patent Application No. 0 285 419 which allows a querying unit to unequivocally recognize one allocated transponder from a group of several transponders allocated to the querying unit. To do so, the querying unit progressively checks the codes of the transponders present in the access region of the querying unit. The codes are configured as multi-digit binary words. In a first query step, the querying unit checks their first digit to determine whether it matches the first digit of a reference code word present in the querying unit. All transponders which do not match at the first digit no longer participate in further testing. The remaining transponders which match at the first digit are then checked, in a second query step, as to whether the second digit of their code words agrees with the second digit of the reference code word in the querying unit. The procedure is repeated until a single transponder, whose binary coding matches all the digits of the reference code in the querying unit, is identified. For unequivocal determination of one among 2n transponders, this procedure requires n query steps. Its effect of selecting one specific qualified transponder from a plurality of transponders qualifies the known apparatus for access protection applications, in particular for situations in which sufficient time is available for performing the recognition method. In practice, however, it is often demanded that the allocation of a remote controller to a relevant base station take place in the shortest possible time, for example in the case of access systems for opening or locking doors. It is the object of the present invention to describe an allocation apparatus which permits an unequivocal allocation of an actuation element to a base station at high speed, while guaranteeing sufficient security.

SUMMARY OF THE INVENTION

The object is achieved by a method and by apparatuses configured for performing this method. The method according to the present invention advantageously eliminates any delay in ascertaining the allocation by the fact that the base station periodically delivers search signals which, when an allocated remote controller is present, initiate an allocation dialog without further user intervention. Advantageously, emission of the search signals is accomplished with little energy outlay using a corresponding energy-intensive carrier signal, while the subsequent allocation dialog, on the other hand, uses a carrier signal which guarantees secure communication. The remote controller is accordingly designed so that it is fundamentally in. an idle state which it departs from only when a search signal enters it. The method according to the present invention allows delay-free allocation even if multiple base stations are arranged in physical proximity, and if the effective ranges of their search signals overlap. In an embodiment suitable for this purpose, the base station has a device for receiving search signals from third-party base stations. Taking into account any third-party search signals being emitted, it transmits its own search signals in such a way that overlaps are prevented. Advantageously, an apparatus according to the present invention further provides a possibility for execution of an allocation test dialog to be initiated by a user.

DETAILED DESCRIPTION

Figure 1:
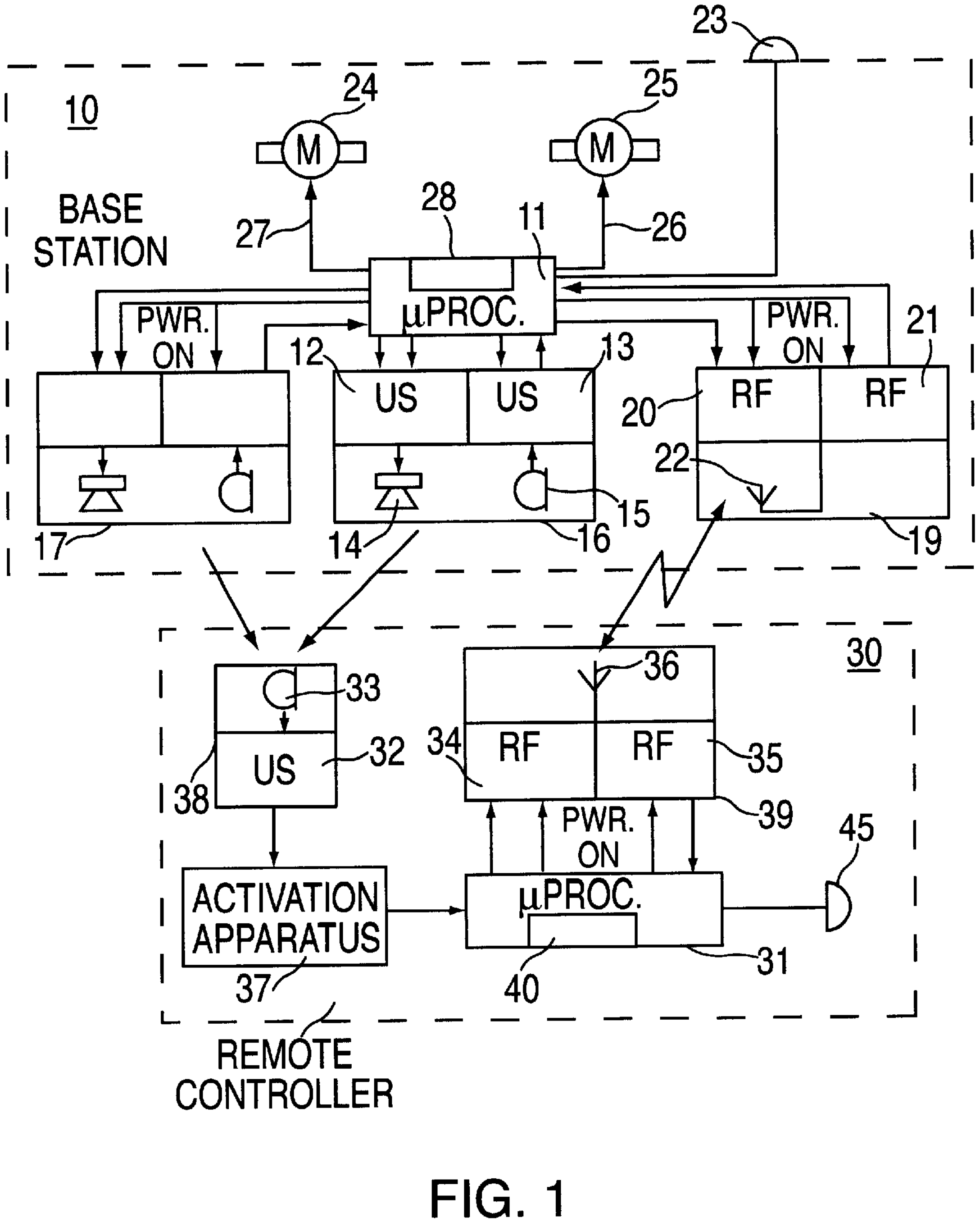
FIG. 1 shows a block diagram of an allocation apparatus.

In FIG. 1, the reference number 10 designates a base station that is part of a device or an object or is permanently allocated thereto. For example, the base station can be part of the access device of a building or a motor vehicle. Reference number 30 designates a device, hereinafter called a remote controller, which is functionally allocated in non-contact fashion to base station 10 via two signal transmission links 28, 29. Remote controller 30 can be, for example, a transponder. Base station 10 acts via effective connections 26, 27 on the technical device of which it is a part or to which it is allocated. As indicated in FIG. 1, these can be, for example, motors 24, 25 for actuating doors.

The core of base station 10 is constituted by a microprocessor 11 which, in particular, monitors and authorizes the output of signals by base station 10—for example via effective connections 26, 27 to technical devices 24, 25—and analyzes incoming signals. Microprocessor 11 has a memory 28 in which is stored, in particular, an algorithm for executing an allocation test dialog. Connected to microprocessor 11 is a transmission/reception device 16, made up of a transmission signal generating device 12, input signal conversion device 13, signal radiator 14, and signal sensor 15, for delivering and receiving signals transmitted on a first signal carrier via transmission link 28, which is configured as an ultrasonic link. Also connected to microprocessor 11 is a second transmission/reception device 19 for delivering and receiving signals transmitted on a second signal carrier via transmission link 29 configured as a radio link, including a transmission signal generating device 20, an input signal conversion device 21, and an antenna 22. In addition, base station 10 can also contain further transmission/reception devices 17 similar in structure to transmission/reception device 16, as depicted in FIG. 1. This is advantageous, for example, when the apparatus is used as an access device in the doors of a multiple-door motor vehicle, each door having allocated to it its own transmission/reception device of the same type as transmission/reception devices 16, 17. Microprocessor 11 is further connected to an actuation arrangement 23, for example in the form of a switch or a keypad, which allows the user to manually influence the operation of microprocessor 11.

The core of the remote controller is also a microprocessor 31, which in particular performs the analysis of incoming signals, initiates subsequent actions based on the result, and monitors the emission of output signals. Allocated to microprocessor 31 is an activation apparatus 37, preceding which is a reception device 38 including an ultrasonic sensing element 33 and input signal conversion device. Reception device 38 corresponds to transmission/reception devices 16, 17 on the base-station side, and with them forms first transmission link 28. Also connected to microprocessor 31 is a transmission/reception device 39 comprising a transmission signal generating device 34, input signal conversion device 35, and antenna 36. Corresponding thereto in base station 10 is transmission/reception device 19, with which it forms second transmission link 29. Microprocessor 31 furthermore has a memory 40 in which, in particular, a reference signal characterizing remote controller 30, and an algorithm for executing an allocation dialog, are stored. Microprocessor 31 is also connected to a control arrangement 45, for example in the form of a switch or a keypad, which permits a user to manually influence the operation of microprocessor 31. The two transmission links 28 and 29 existing between base station 10 and remote controller 30 differ in terms of the carrier signal form used in each case. The carrier signal form used for transmission link 28 is one that allows energy-saving maintenance of the transmission link and has a large effective range. Ultrasonic signals have proven suitable for these criteria. Second transmission link 29 is advantageously realized using a carrier signal that permits a reliable and interference-insensitive dialog between the participating transmission/reception devices 19, 39. High-frequency signals, among others, are suitable for this.

Figure 2:
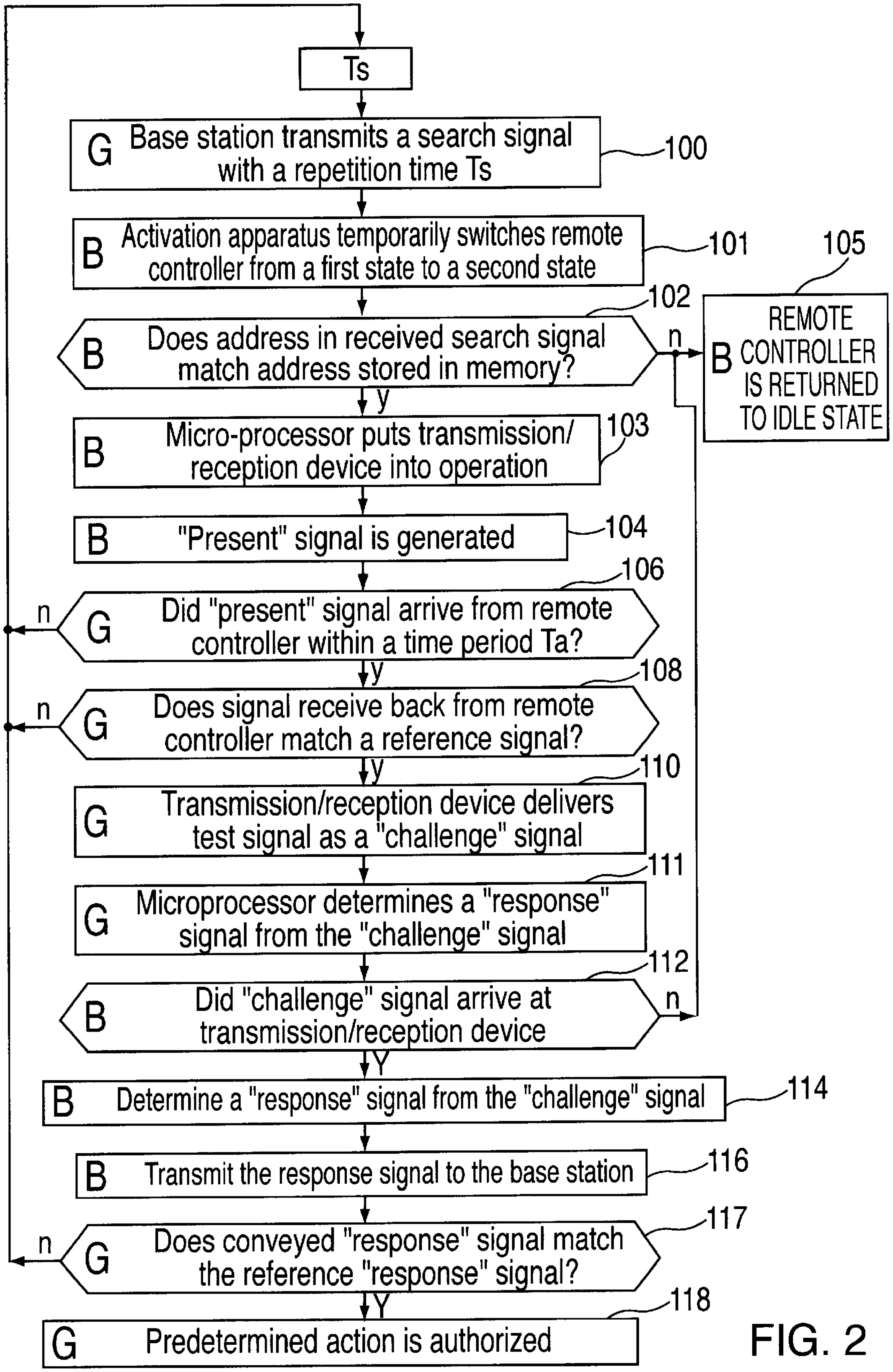
FIG. 2 shows a flow chart to illustrate an operation of the allocation apparatus.
Figure 4:
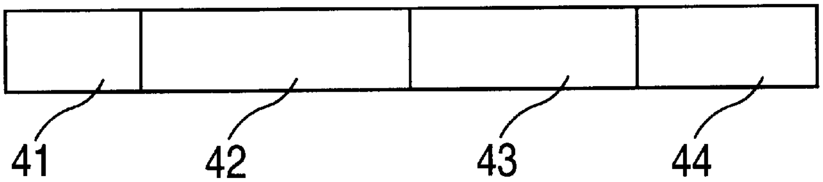
FIG. 4 shows a structure of a search signal.

The manner of operation of the apparatus depicted in FIG. 1 will be explained below with reference to the flow chart in FIG. 2. Preceding each of the procedural steps is a letter G or B, which indicates whether the procedural step in question takes place in base station 10 (G) or in remote controller 30 (B). In the waiting state, as long as no allocation is taking place and no remote controller is within the range of transmission link 28, base station 10 periodically transmits a search signal with a repetition time Ts (step 100). Repetition time Ts is selected so that no perceptible delay is apparent to a user; it is advantageously less than one second. The search signal itself advantageous extends over a duration on the order of 1/100th of a second. One possible structure of a search signal is reproduced in FIG. 4. According to this, the search signal has a start sequence 41 in order to switch remote controllers 10 that are within range of transmission link 28 into the active state, a subsequent synchronization sequence 42 to synchronize remote controllers 30 to base station 10, an address field with the address of a remote controller 30 allocated to base station 10 that is sending out the search signal, and an additional byte 44 optionally containing additional information that is advantageous for allocation. For example, additional byte 44 can contain an indication as to which transmission/reception device 16, 17 it comes from.

The search signal delivered by base station 10 is received, via their reception devices 38, by all remote controllers 30 located with range of transmission link 28, and conveyed to activation apparatus 37, which thereupon switches remote controller 30 temporarily from a first operating state (idle state) into a second operating state (active state) (step 101). Microprocessor 31 now checks (step 102) whether address 43 contained in the received search signal matches the address stored in memory 40. If not, microprocessor 31 causes remote controller 30 to return to the idle state, in which it exhibits minimal energy consumption and merely maintains readiness to receive a new search signal by way of reception device 38 (step 105). If the check in step 102 results in a match between the address contained in the search signal and the stored address, microprocessor 31 puts transmission/reception device 39 into operation (step 103). It then, via transmission/reception device 39 that is now in operation, causes the emission of a "present" signal. In simple fashion, this is a signal matching the received search signal.

In the meantime, base station 10 checks whether a "present" signal has arrived from a remote controller 30 within a time period Ta that begins with emission of the search signal (step 106); time Ta is adapted to the nature of transmission links 28, 29 and the elements participating therein. If a "present" signal does not arrive within period Ta, base station 10 continues with emission of a further search signal after repetition time Ts has elapsed. If the check in step 106 indicates reception, at the correct time, of a "present" signal from a remote controller 30, base station 10 checks whether the signal received back from remote controller 30 via transmission link 29 matches a reference signal (step 108). If remote controller 30 confirms its presence, for example by sending back the search signal, a check is made as to whether the "present" signal that is received back matches a reference signal stored in memory 27 (step 110), for example the search signal sent out previously (step 108). If not, base station 10 once again continues with transmission of another search signal (step 100).

If a "present" signal received back via transmission link 29 from a remote controller 30 matches the previously stored reference signal, microprocessor 11 in the base station initiates an allocation dialog on transmission link 29. In this context, it causes transmission/reception device 19 to deliver a test signal in the form of a "challenge" signal (step 110), i.e. a complex signal sequence suitable for checking the correctness of the allocation between base station 10 and remote controller 30. Microprocessor 11 simultaneously determines from the "challenge" signal, with the aid of the coding algorithm stored in memory 27, a "response" signal (step 111) which it then in turn stores in memory 27 as the reference "response" signal. Meanwhile microprocessor 31 in the remote controller checks whether, within a time period Tb that begins with emission of the "present" signal, a "challenge" signal has arrived at transmission/reception device 39 (step 112). Time period Tb is once again adapted to the technical nature of transmission link 29 and the elements participating therein. If a "challenge" signal has not arrived within time Tb, microprocessor 31 causes remote controller 30 to return to the idle state (step 105). If the check in step 112 indicates that a "challenge" signal has arrived within time period Tb, microprocessor 31 ascertains from the "challenge" signal, using the algorithm stored in memory 40, a "response" signal (step 114) which it then transmits via transmission signal generation device 34 and antenna 36 to base station 10 (step 116). There it is received in antenna 22, converted by signal conversion device 21 into an electrical signal 19, and conveyed to microprocessor 11. The latter compares the conveyed "response" signal to the reference "response" signal stored in its memory 27 (step 117). If this results in a non-match between "response" signal and reference "response" signal, microprocessor 11 causes base station 10 to return to the waiting state, and after time Ts has elapsed, continues with emission of another search signal (step 100). If the check in step 117 yields a match between the reference "response" signal and the "response" signal, microprocessor 21 authorizes a predetermined action (step 118) and, for example, actuates motor-drive locking devices which each open associated doors. The particular action initiated can also be determined by additional byte 44, so that, for example, only that technical device 24, 25 which is located physically closest to remote controller 30 is actuated.

Figure 3:
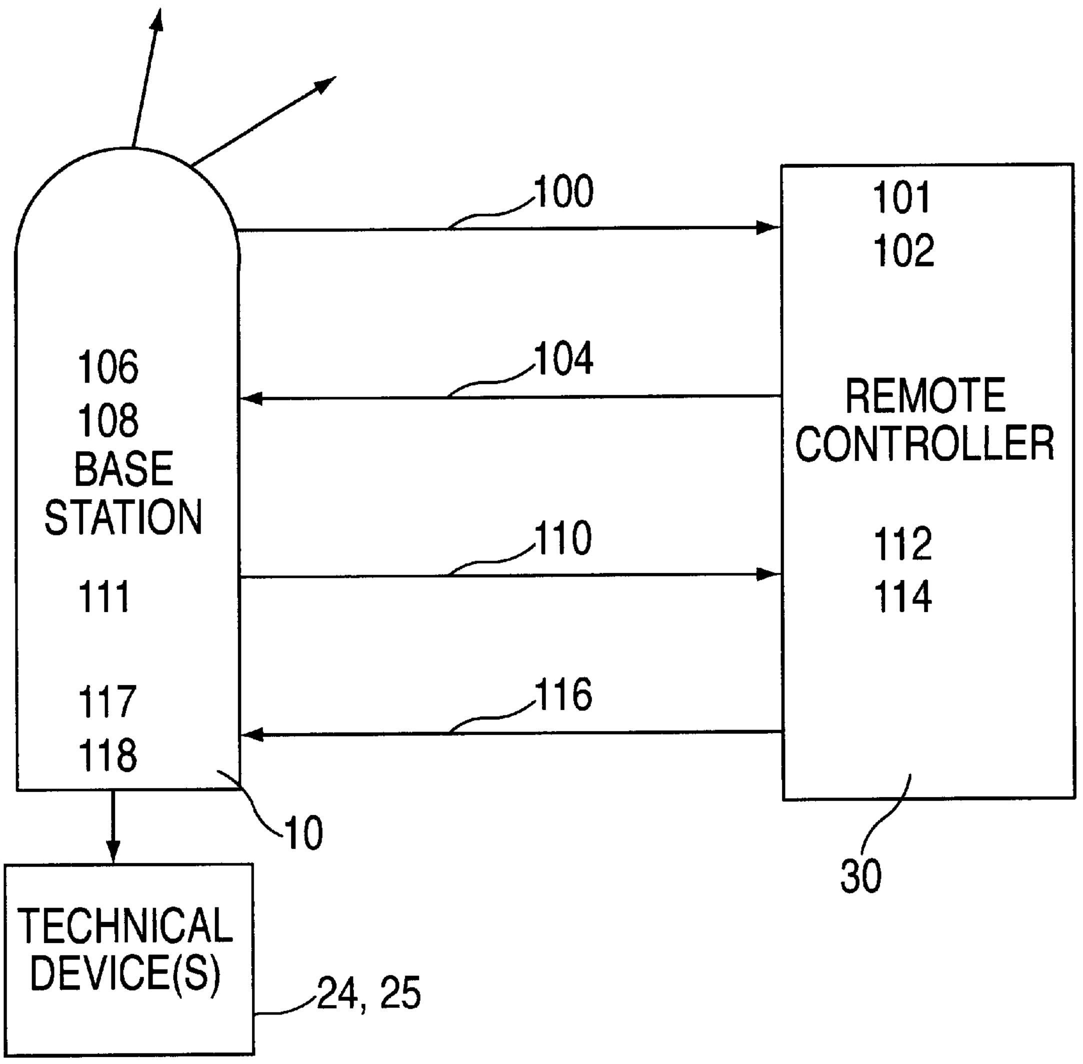
FIG. 3 shows an illustration of a signal flow between a base station and a remote controller.

FIG. 3 illustrates the signal flow occurring in the context of an allocation operation in a space-time-related depiction. The time axis extends from bottom to top, and the respective procedural steps that take place are indicated by the reference characters used in FIG. 2. The allocation process begins with transmission of a search signal by base station 10 (step 100), followed by checking of the received search signal in remote controller 30 (steps 101, 102) and emission of a "present" signal (step 104) in the opposite direction. After this has been checked (steps 106, 108), base station 10 replies by sending out a "challenge" signal (step 110) which is then checked in turn in remote controller 30 and results in a "response" signal being sent back (step 115). If the latter, after checking by base station 10, matches the reference "response" signal ascertained previously (step 111), the action affecting technical devices 24, 25 is performed (step 118).

Figure 5:
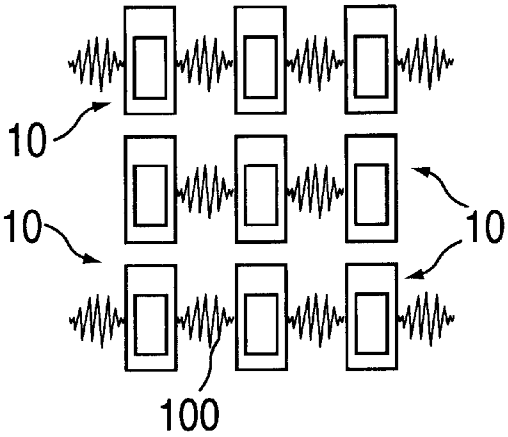
FIG. 5 shows a collision situation.
Figure 6:
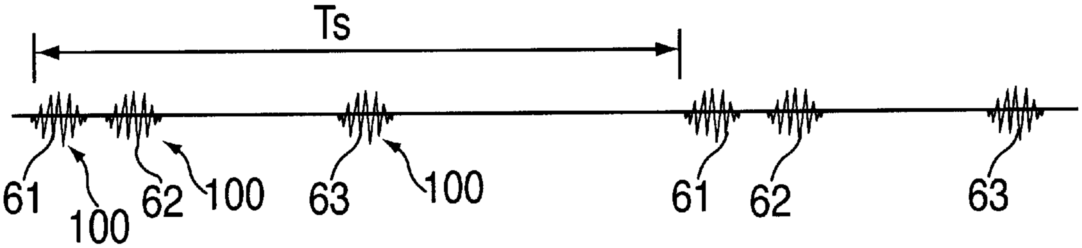
FIG. 6 shows a first distribution of the search signal over time.
Figure 7:
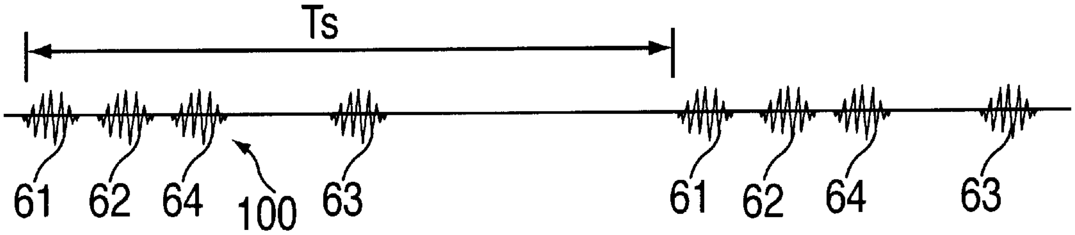
FIG. 7 shows a second distribution of the search signal over time.

If, as indicated in FIG. 5, several base stations 10 are arranged in immediate physical proximity, it is possible, if no corrective actions have been taken, for the effective ranges of the search signals emitted by the individual base stations 10 to overlap; the consequence is that the search signals transmitted via transmission link 28 are no longer recognized as such by remote controllers 30. Remote controllers 30 consequently do not switch from the idle state to the active state. In order to guarantee rapid allocation even in a case such as this, base stations 10 each have a reception device, comprising an antenna 15 and signal conversion device 13, for receiving search signals from adjacent base stations. Search signals received therewith are recorded by microprocessor 11. For example, the situation reproduced in FIG. 6 might occur. In this case three search signals 61 through 63 from third-party base stations have arrived at transmission/reception device 14 in succession, at non-identical intervals. From the periodicity of the overall group, microprocessor 11 ascertains repetition time Ts. This contains, as is evident from FIG. 6, segments in which no search signal occurs. Microprocessor 31 now places its own search signal 64 into one such segment, as depicted in FIG. 7. Identification of the temporal position of third-party search signals, and determination of a suitable point in time for transmission of an own search signal, are advantageously accomplished in a separate "eavesdropping" mode which base station 10 assumes for a limited time in each case before transitioning into the waiting state.

Figure 8:
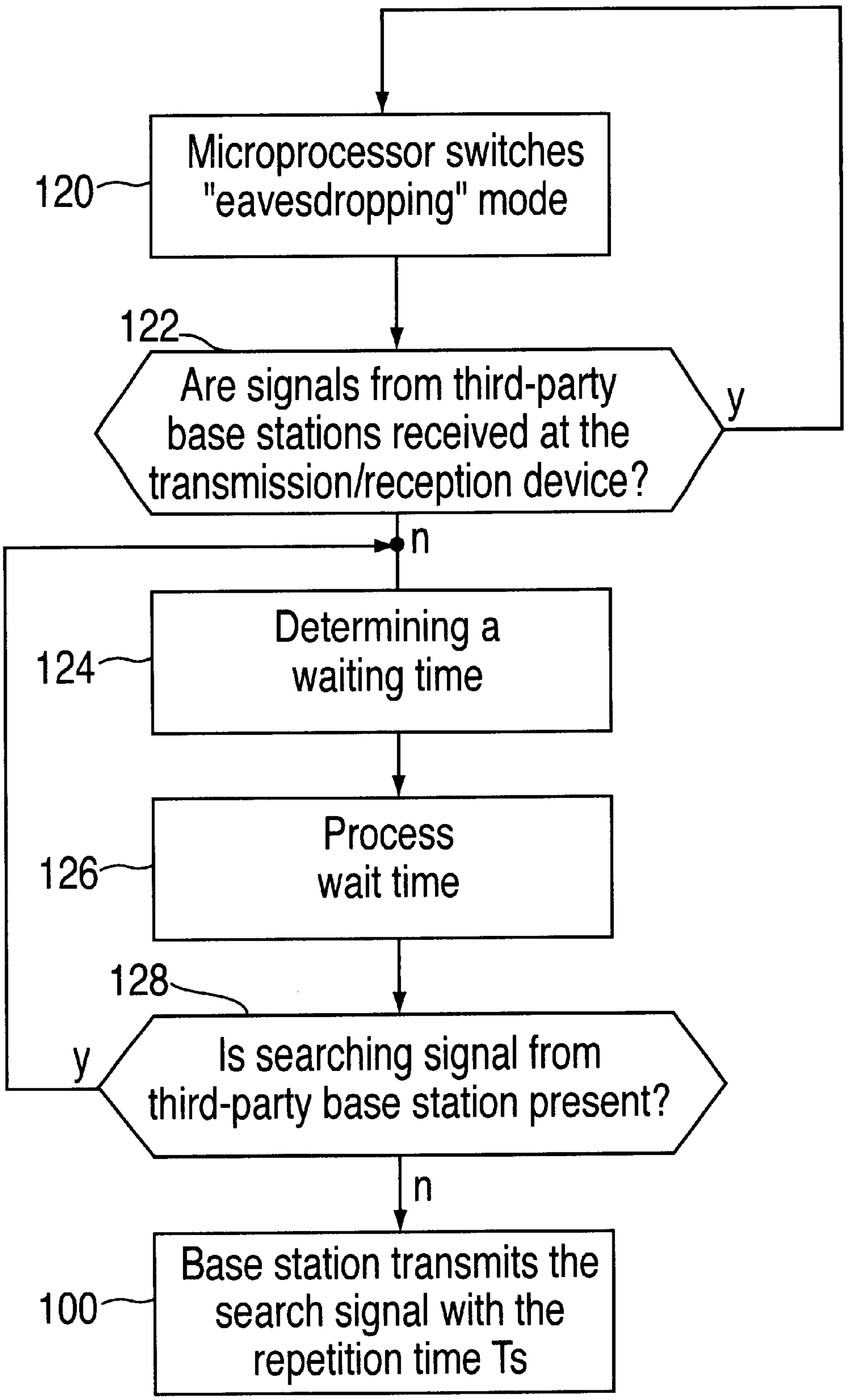
FIG. 8 shows a flow chart for identifying a point in time for transmitting the search signal.

Another possibility for preventing the overlap of search signals from base stations 10 arranged in physical proximity to one another will be explained below with reference to FIG. 8. Once again microprocessor 11, before transitioning into the waiting state with subsequent emission of search signals, switches first into an "eavesdropping" mode (step 120) in which it checks whether search signals from third-party base stations 10 are being received at transmission/reception device 16, 17. If so, it remains in "eavesdropping" mode and repeats the query (step 122). If it ascertains, in the check in step 122, that a search signal of an third-party base station is not present, it determines—based on a pseudorandom number which is a function of address 43 contained in the search signal and can be defined using the equation: pseudorandom number=k*[(s*b+1) modulo m], where s=search signal address, m=a constant corresponding to the maximum possible number of search signals within repetition time Ts, b=a randomness-maximizing constant (e.g. b=0.125), and k=scaling factor, and taking into account the typical repetition time Ts—a waiting time (step 124) which it then processes (step 126). Once the waiting time has elapsed, it checks again (step 128) as to whether a search signal from a third-party base station is present. If this check indicates that after processing of the waiting time, a search signal of a third-party base station is not present, microprocessor 31 causes transmission of its own search signal via transmission link 28.

To ensure that communication is established between base station 10 and remote controller 30 even in an environment affected by strong interference signals, base station 10 is advantageously designed to perform both of the anti-collision methods described above. It switches respectively from one to the other if communication has not been established after performing a predefined, fixed number of attempts using one method. Provision can also be made, in the case of strong ambient signals, for varying the search signal transmission output and increasing the reception sensitivity of remote controller 30.

To further improve the usability of the apparatus being proposed, it is advantageous to provide a possibility for execution of an allocation test dialog to be initiated manually by a user, rather than having remote controller 30 react automatically to a search signal transmitted by a base station. Remote controller 30 has, for this purpose, suitable control means 45, e.g. in the form of one or more switches, by way of which activation of microprocessor 31, and of transmission/reception device 39 downstream from it, into the active state can be initiated directly. In this case, microprocessor 31 causes transmission of a "present" signal whose additional byte 44 contains a datum indicating manual startup. This is recognized in base station 10 by microprocessor 11, which thereupon immediately causes transmission of a "challenge" signal (step 110), and implementation of the further steps indicated in FIG. 2.

Base station 10 advantageously also has a suitable control arrangement 23, for example in the form of a switch actuated by the door handle, with which an abbreviated manual allocation action is possible. Once a manual allocation action has been initiated thereby via base station 10, the latter transmits to remote controller 30 a search signal whose additional byte contains a datum indicating manual actuation. This is recognized by microprocessor 31 in the remote controller, which thereupon immediately performs step 112 and awaits the arrival of a "challenge" signal from base station 10.

Additional embodiments, in particular of the proposed apparatuses, can also be provided while retaining the underlying idea of performing a rapid, unequivocal allocation of a remote controller to a base station by switching the remote controller into an active state only upon the arrival of a search signal but fundamentally remaining in an energy-saving idle state, and then performing an allocation check. This applies, for example, to the configuration of base stations 10 and remote controllers 30, or to the configuration of the search signal that is used. It is moreover also possible, in particular, to use different carrier signal forms, for example to use microwaves for the search signal.

What is claimed is:

1. A base station, comprising:

at least one transmission device emitting a first search signal and a second search signal, the second search signal being emitted immediately after the first search signal;

a reception device receiving a particular signal from a remote controller;

a first arrangement determining if the particular signal has arrived at the base station; and a second arrangement determining a time period which has elapsed starting from a time when the at least one transmission device emits the second search signal, wherein the at least one transmission device repeats the emission after the time period elapses if the particular signal has not arrived at the base station in response to a receipt of the first search signal.

2. The base station according to claim 1, wherein, after the predetermined signal arrives at the base station, the base station initiates an allocation dialog with the remote controller by transmitting a test signal to the remote controller.

3. The base station according to claim 1, wherein the second search signal includes an address of the remote controller.

4. The base station according to claim 1, wherein the at least one transmission device includes a plurality of transmission devices emitting a plurality of further search signals, and wherein the further search signals include a datum identifying a transmitter from which the further search signals are derived.

5. The base station according to claim 1, wherein the reception device receives the first and second search signals.

6. The base station according to claim 1, further comprising:

a third arrangement determining a further repetition time period of third-party search signals generated by third-party base stations.

7. The base station according to claim 1, wherein, only if further search signals are not being transmitted by further base stations simultaneously with the second search signal, the at least one transmission device emits the second search signal.

8. The base station according to claim 1, wherein, if further search signals generated by third-party base stations arrive at the base station simultaneously with the second search signal, the base station delays the at least one transmission device from emitting the second search signal.

9. The base station according to claim 1, wherein, if a further search signal generated by a third-party base station is simultaneously present with the second search signal emitted by the at least one transmission device, the base station determines a waiting time period in a randomly controlled manner, and wherein the at least one transmission device transmits the second search signal after the waiting time period.

10. An apparatus for allocating a remote controller to a base station, comprising:

a transmission device emitting first and second search signals and being arranged in the base station, the second search signal being transmitted immediately following the first search signal; and a processing device being arranged in the remote controller, the processing device including an arrangement which:

receives further search signals, and transmits a particular signal if the second search signal matches a reference signal, wherein, if the particular signal has not arrived in response to a receipt of the first search signal, the transmission device emits another search signal after a predetermined repetition time period.

11. The apparatus according to claim 10, wherein the base station and the remote controller establish an allocation dialog therebetween, and wherein the second search signal and the allocation dialog are capable of utilizing predetermined carrier signal forms.

12. The apparatus according to claim 10, wherein the base station and the remote controller establish an allocation dialog therebetween, and wherein the allocation dialog uses high-frequency signals.

13. The apparatus according to claim 10, wherein the second search signal is an ultrasonic signal.

14. A method for allocating a remote controller to a base station, comprising the steps of:

(a) emitting a first search signal by the base station;

(b) emitting a second search signal by the base station, the second search signal being emitted immediately after the first search signal;

(c) receiving the second search signal by the remote controller;

(d) in the remote controller, comparing the second search signal to a reference signal;

(e) emitting a particular signal by the remote controller if the second search signal matches the reference signal;

(f) if the particular signal has not arrived at the base station in response to a reception of the first search signal, repeating step (a) after a predetermined repetition time period.

* * * * *